United States Patent
Lombard et al.

(10) Patent No.: US 10,465,706 B2
(45) Date of Patent: Nov. 5, 2019

(54) ADJUSTABLE-TRIM CENTRIFUGAL COMPRESSOR FOR A TURBOCHARGER

(71) Applicant: Honeywell International Inc., Morris Plains, NJ (US)

(72) Inventors: Alain Lombard, Vosges (FR); Stephane Pees, Ceintrey (FR); Hani Mohtar, Chaumousey (FR); Stephane Doise, Epinal (FR)

(73) Assignee: Garrett Transportation I Inc., Torrance, CA (US)

( * ) Notice: Subject to any disclaimer, the term of this patent is extended or adjusted under 35 U.S.C. 154(b) by 322 days.

(21) Appl. No.: 15/446,054

(22) Filed: Mar. 1, 2017

(65) Prior Publication Data

US 2017/0298953 A1 Oct. 19, 2017

Related U.S. Application Data

(60) Provisional application No. 62/324,488, filed on Apr. 19, 2016.

(51) Int. Cl.
*F04D 29/46* (2006.01)
*F04D 17/10* (2006.01)
(Continued)

(52) U.S. Cl.
CPC ............ *F04D 29/462* (2013.01); *F02B 37/00* (2013.01); *F02B 37/225* (2013.01); *F02B 37/24* (2013.01);
(Continued)

(58) Field of Classification Search
CPC ........ F02B 37/00; F02B 37/16; F02B 37/225; F02B 37/24; F02B 39/00; F04D 17/10;
(Continued)

(56) References Cited

U.S. PATENT DOCUMENTS 4,122,668 A † 10/1978 Chou
4,893,225 A * 1/1990 Solomon .................. F21V 9/40
362/293
(Continued)

FOREIGN PATENT DOCUMENTS

DE 102010026176 A1 1/2012
DE 102011121996 B4 6/2013
(Continued)

OTHER PUBLICATIONS

The European search opinion of EP Application No. 17 162 936.†

*Primary Examiner* — Patrick D Maines
*Assistant Examiner* — Dapinder Singh
(74) *Attorney, Agent, or Firm* — John C. James

(57) ABSTRACT

A centrifugal compressor for a turbocharger includes an inlet-adjustment mechanism in an air inlet for the compressor, operable to move between an open position and a closed position in the air inlet. The inlet-adjustment mechanism includes a plurality of blades disposed about the air inlet and each pivotable about one end of the blade, the blades extending through a slot in the air inlet wall when the blades are in the closed position so as to form an orifice of reduced diameter relative to a nominal diameter of the inlet. Movement of the inlet-adjustment mechanism from the open position to the closed position is effective to shift the compressor's surge line to lower flow rates.

11 Claims, 8 Drawing Sheets

(51) Int. Cl.
*F04D 27/02* (2006.01)
*F04D 25/04* (2006.01)
*F02B 37/00* (2006.01)
*F02B 37/22* (2006.01)
*F04D 27/00* (2006.01)
*F02B 37/24* (2006.01)
*F04D 29/42* (2006.01)
*F04D 29/68* (2006.01)
*F16K 3/03* (2006.01)
*F02B 37/16* (2006.01)

(52) U.S. Cl.
CPC ............ *F04D 17/10* (2013.01); *F04D 25/04* (2013.01); *F04D 27/002* (2013.01); *F04D 27/0246* (2013.01); *F04D 27/0253* (2013.01); *F04D 29/4213* (2013.01); *F04D 29/464* (2013.01); *F04D 29/681* (2013.01); *F16K 3/03* (2013.01); *F02B 37/16* (2013.01); *F05D 2220/40* (2013.01); *Y02T 10/144* (2013.01)

(58) Field of Classification Search
CPC .... F04D 25/04; F04D 27/002; F04D 27/0246; F04D 27/0253; F04D 29/4213; F04D 29/464; F04D 29/681; F04D 29/462; F16K 3/03; Y02T 10/144; F05B 2220/40

USPC ..................................... 60/600; 415/163–164
See application file for complete search history.

(56) References Cited

U.S. PATENT DOCUMENTS

| | | | |
|---|---|---|---|
| 2009/0095350 A1* | 4/2009 | Bauman | F16K 3/03 137/1 |
| 2014/0308110 A1† | 10/2014 | Houst | |
| 2015/0041695 A1* | 2/2015 | Daniels | F16K 3/03 251/212 |
| 2017/0211707 A1† | 7/2017 | Wakayama | |

FOREIGN PATENT DOCUMENTS

| DE | 102013003418 A1 | 8/2014 |
|---|---|---|
| WO | 2013074503 A1 | 5/2013 |
| WO | 2016041024 A2 | 3/2016 |

\* cited by examiner
† cited by third party

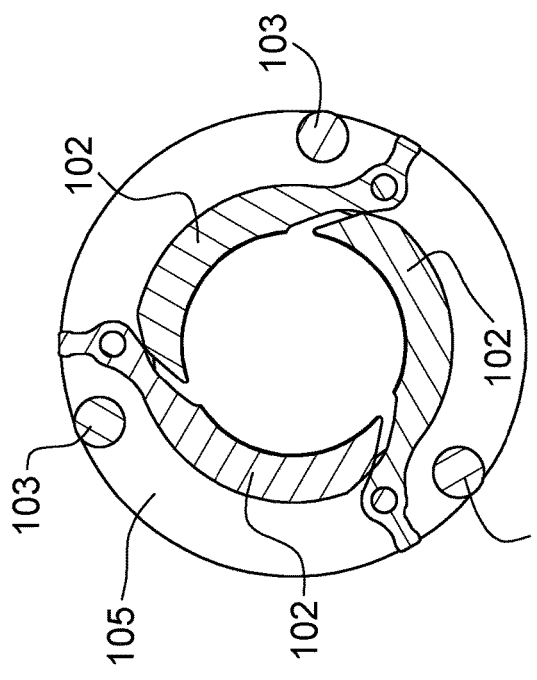
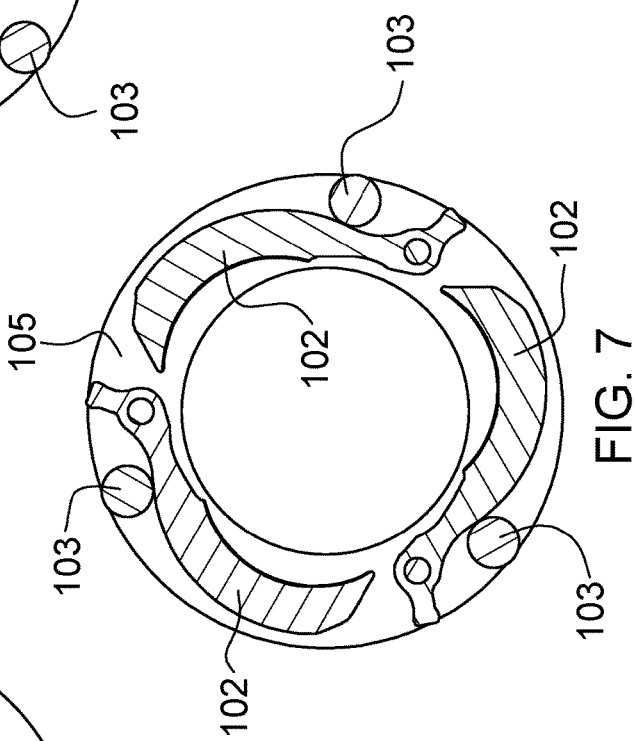
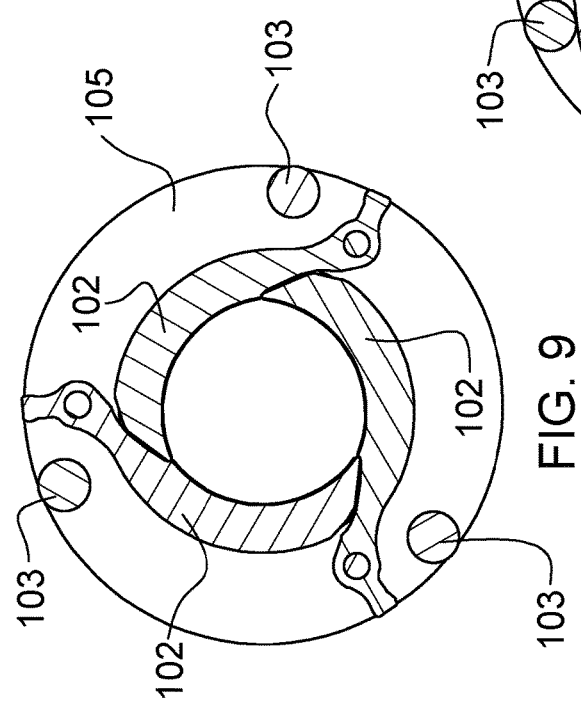

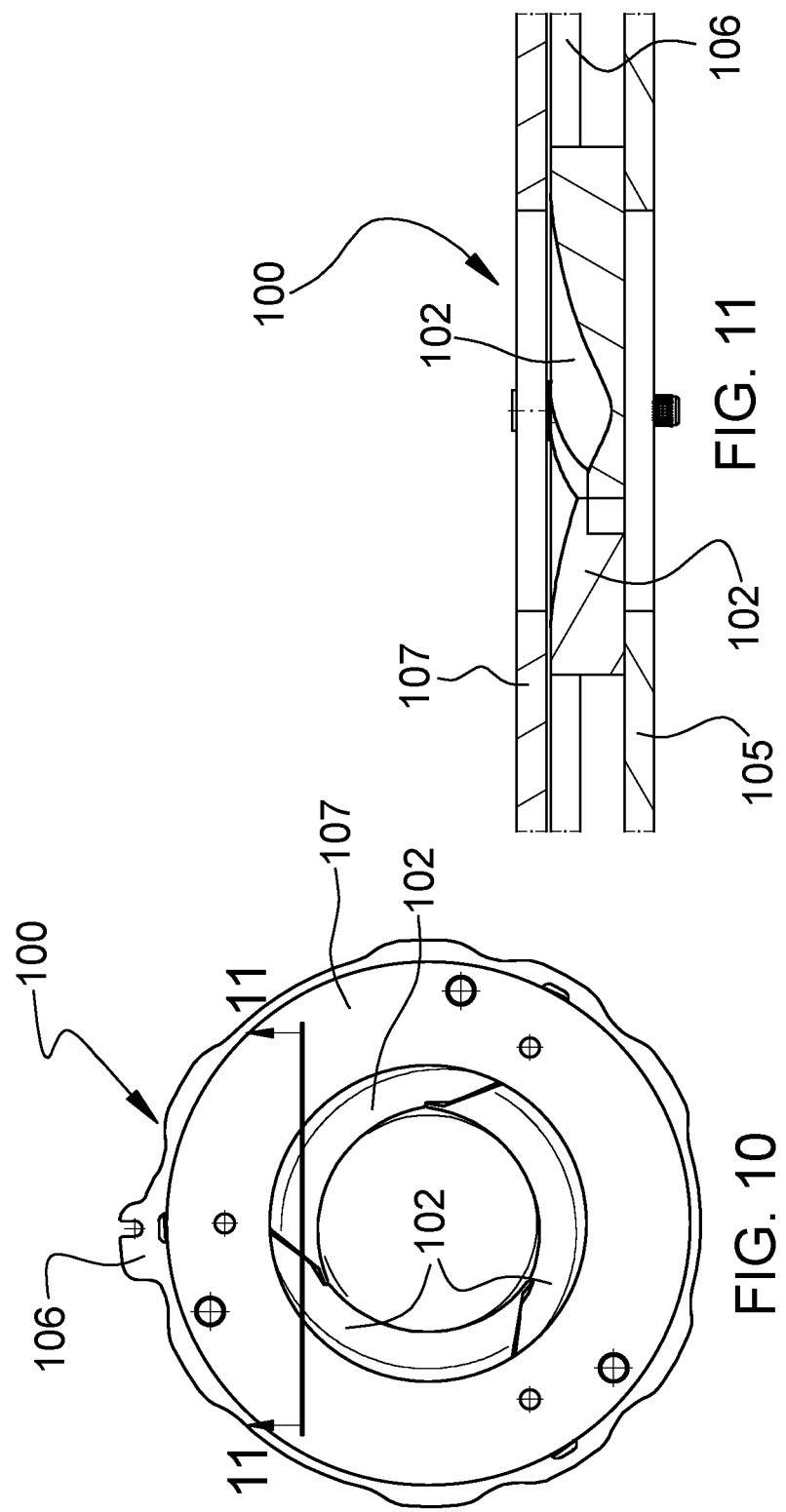

ADJUSTABLE-TRIM CENTRIFUGAL COMPRESSOR FOR A TURBOCHARGER

BACKGROUND OF THE INVENTION

The present disclosure relates to centrifugal compressors, such as used in turbochargers, and more particularly relates to centrifugal compressors in which the effective inlet area or diameter can be adjusted for different operating conditions.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

Turbochargers typically employ a compressor wheel of the centrifugal (also known as "radial") type because centrifugal compressors can achieve relatively high pressure ratios in a compact arrangement. Intake air for the compressor is received in a generally axial direction at an inducer portion of the centrifugal compressor wheel and is discharged in a generally radial direction at an exducer portion of the wheel. The compressed air from the wheel is delivered to a volute, and from the volute the air is supplied to the intake of an internal combustion engine.

The operating range of the compressor is an important aspect of the overall performance of the turbocharger. The operating range is generally delimited by a surge line and a choke line on an operating map for the compressor. The compressor map is typically presented as pressure ratio (discharge pressure Pout divided by inlet pressure Pin) on the vertical axis, versus corrected mass flow rate on the horizontal axis. The choke line on the compressor map is located at high flow rates and represents the locus of maximum mass-flow-rate points over a range of pressure ratios; that is, for a given point on the choke line, it is not possible to increase the flow rate while maintaining the same pressure ratio because a choked-flow condition occurs in the compressor.

The surge line is located at low flow rates and represents the locus of minimum mass-flow-rate points without surge, over a range of pressure ratios; that is, for a given point on the surge line, reducing the flow rate without changing the pressure ratio, or increasing the pressure ratio without changing the flow rate, would lead to surge occurring. Surge is a flow instability that typically occurs when the compressor blade incidence angles become so large that substantial flow separation arises on the compressor blades. Pressure fluctuation and flow reversal can happen during surge.

In a turbocharger for an internal combustion engine, compressor surge may occur when the engine is operating at high load or torque and low engine speed, or when the engine is operating at a low speed and there is a high level of exhaust gas recirculation (EGR). Surge can also arise when an engine is suddenly decelerated from a high-speed condition. Expanding the surge-free operation range of a compressor to lower flow rates is a goal often sought in compressor design.

BRIEF SUMMARY OF THE DISCLOSURE

The present disclosure describes mechanisms and methods for a centrifugal compressor that can enable the surge line for the compressor to selectively be shifted to the left (i.e., surge is delayed to a lower flow rate at a given pressure ratio). One embodiment described herein comprises a turbocharger having the following features:

a turbine housing and a turbine wheel mounted in the turbine housing and connected to a rotatable shaft for rotation therewith, the turbine housing receiving exhaust gas and supplying the exhaust gas to the turbine wheel;

a centrifugal compressor assembly comprising a compressor housing and a compressor wheel mounted in the compressor housing and connected to the rotatable shaft for rotation therewith, the compressor wheel having blades and defining an inducer portion, the compressor housing having an air inlet wall defining an air inlet for leading air generally axially into the compressor wheel, the compressor housing further defining a volute for receiving compressed air discharged generally radially outwardly from the compressor wheel; and a compressor inlet-adjustment mechanism disposed in the air inlet of the compressor housing and pivotable radially inwardly and radially outwardly between an open position and a closed position, the inlet-adjustment mechanism comprising a plurality of blades disposed about the air inlet and each pivotable about one end of the blade, the blades pivoting radially inwardly through a slot in the air inlet wall when the blades are in the closed position so as to form an orifice of reduced diameter relative to a nominal diameter of the inlet.

In accordance with one embodiment, each blade includes a radially inner edge having a circular-arc shape, the blades being configured so that said radially inner edges collectively form the orifice as substantially circular in a selected position of the inlet-adjustment mechanism.

The selected position in which the radially inner edges of the blades form the orifice as substantially circular can be the closed position in some embodiments of the invention.

In one embodiment, the blades are coplanar and respective edge portions of adjacent blades have complementing shapes configured to allow said adjacent blades to partially overlap when the blades are pivoted radially inwardly from the closed position to a super-closed position in which the blades form an orifice of further-reduced diameter relative to that in the closed position.

Each blade can include a radially inner edge having a circular-arc shape, the blades being configured so that said radially inner edges collectively form the orifice as substantially circular in said super-closed position of the inlet-adjustment mechanism.

In one embodiment the inlet-adjustment mechanism comprises a pair of annular end plates that are axially spaced apart and the blades are disposed between said end plates, such that the inlet-adjustment mechanism forms a "cartridge" installable in the compressor. The inlet-adjustment mechanism or cartridge is disposed in an annular space defined by the compressor housing. The annular space can be defined between a main portion of the compressor housing and a separate inlet duct member that forms the majority of the air inlet to the compressor. The duct member is received into a receptacle defined in the main portion of the compressor housing.

The end plates can be spaced apart by a plurality of pins that pass through holes in the blades, and the blades can pivot about said pins.

Alternatively, the pins can be secured in the compressor housing such that separate end plates are not necessary (i.e., the inlet-adjustment mechanism is not a stand-along cartridge). For example, the function of one end plate can be served by an integral portion of the compressor housing, and the function of the other end plate can be served by an integral portion of the inlet duct member.

In accordance with one embodiment the inlet-adjustment mechanism further comprises a unison ring surrounding the blades, the unison ring being rotatable about a rotational axis of the turbocharger, wherein each of the blades is engaged with the unison ring such that rotation of the unison ring causes the blades to pivot about said pins. Each blade includes an end portion that engages a slot defined in an inner periphery of the unison ring.

The inlet-adjustment mechanism can further comprise a plurality of guides for guiding rotation of the unison ring. The guides can be secured to at least one of the end plates (or to the compressor housing and/or the inlet duct member in the case of a non-cartridge form of inlet-adjustment mechanism).

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 7 is a cross-sectional view through the inlet-adjustment mechanism along line 7-7 in FIG. 6, showing the inlet-adjustment mechanism in a super-closed position characterized by partial overlapping of the co-planar blades of the mechanism;

FIG. 8 is a view similar to FIG. 7, with the inlet-adjustment mechanism in a closed position;

FIG. 9 is a view similar to FIG. 7, with the inlet-adjustment mechanism in the fully open position;

FIG. 10 is an axial view of the inlet-adjustment mechanism in the super-closed position; and FIG. 11 is a cross-sectional view of the inlet-adjustment mechanism along line 11-11 in FIG. 10.

DETAILED DESCRIPTION OF THE DRAWINGS

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

In the present disclosure, the term "orifice" means "opening" without regard to the shape of the opening. Thus, an "orifice" can be circular or non-circular. Additionally, when the blades of the inlet-adjustment mechanism are described as pivoting "radially" inwardly or outwardly, the term "radially" does not preclude some non-radial component of movement of the blades (for example, the blades may occupy a plane that is angled slightly with respect to the rotational axis of the compressor, such that when the blades pivot radially inwardly and outwardly, they also move with a small axial component of motion).

Figure 1:
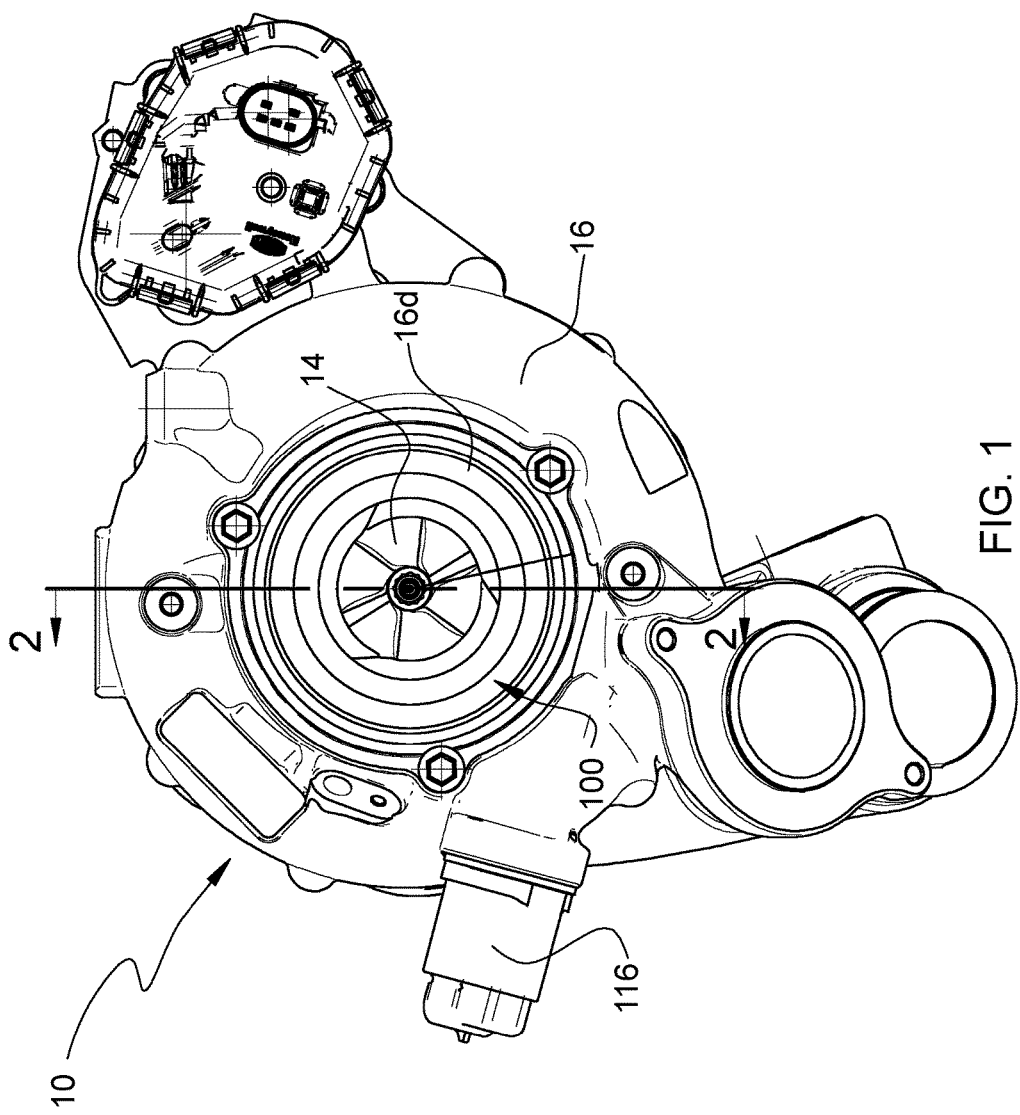
FIG. 1 is an end view of a turbocharger in accordance with one embodiment of the invention, looking axially from the compressor end toward the turbine end of the turbocharger.
Figure 2:
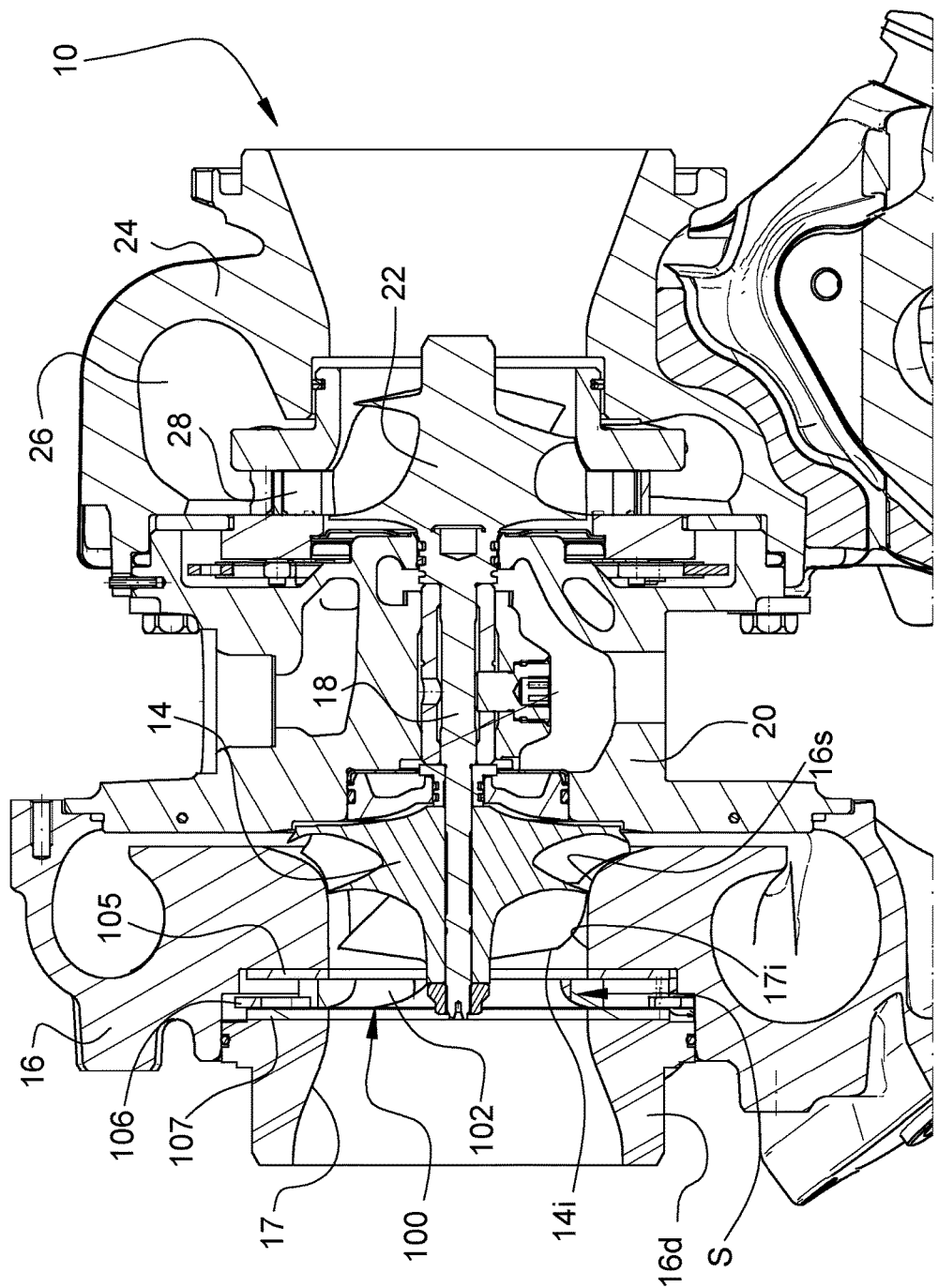
FIG. 2 is a cross-sectional view of the turbocharger along line 2-2 in FIG. 1.
Figure 3:
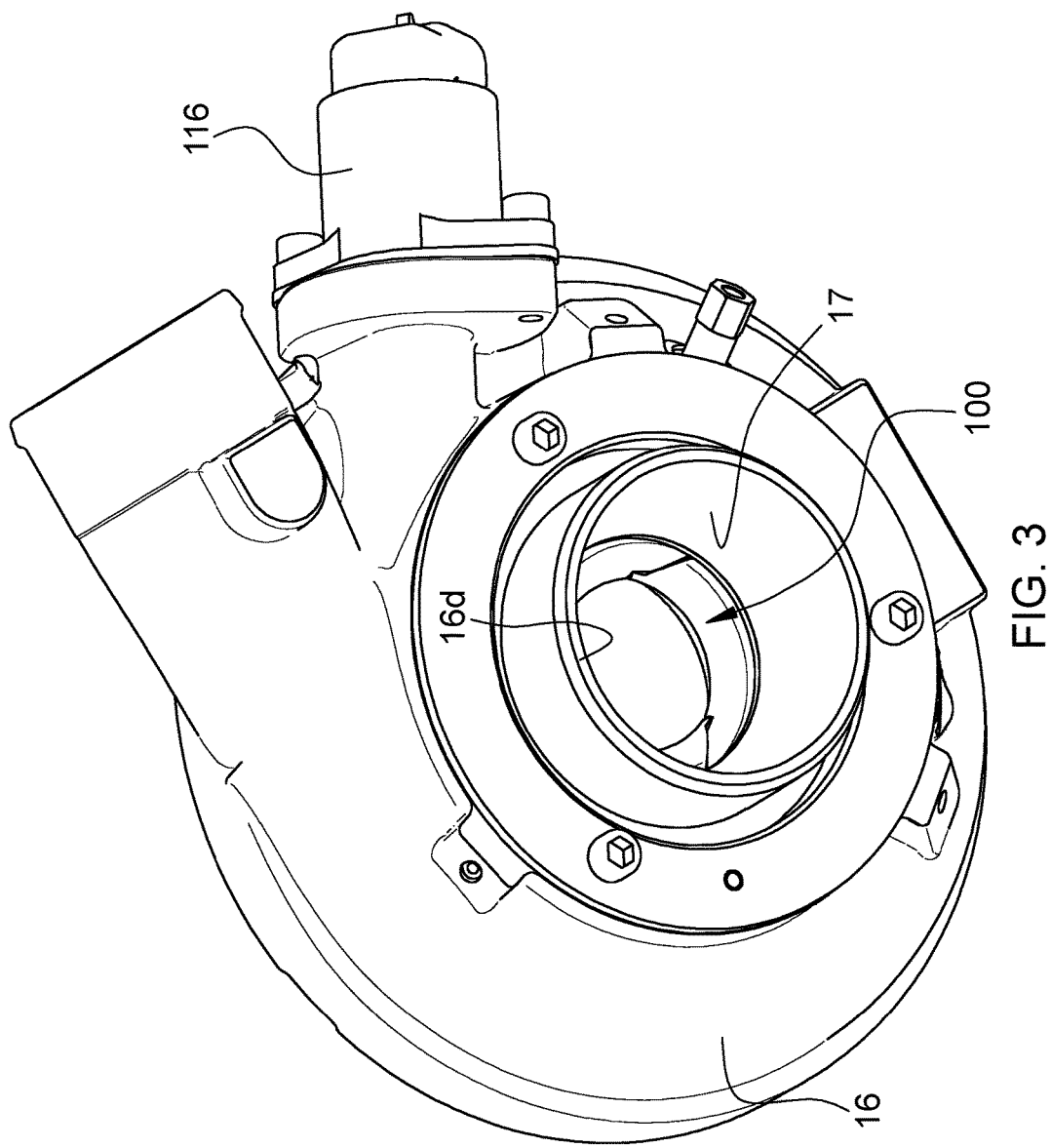
FIG. 3 is a perspective view of the compressor portion of the turbocharger of FIG. 1.

A turbocharger 10 in accordance with one embodiment of the invention is illustrated in axial end view in FIG. 1, and an axial cross-sectional view of the turbocharger is shown in FIG. 2. The turbocharger includes a compressor and a turbine. The compressor comprises a compressor wheel or impeller 14 mounted in a compressor housing 16 on one end of a rotatable shaft 18. The compressor housing includes a wall that defines an air inlet 17 for leading air generally axially into the compressor wheel 14. The shaft is supported in bearings mounted in a center housing 20 of the turbocharger. The shaft is rotated by a turbine wheel 22 mounted on the other end of the shaft from the compressor wheel, thereby rotatably driving the compressor wheel, which compresses air drawn in through the compressor inlet and discharges the compressed air generally radially outwardly from the compressor wheel into a volute 21 for receiving the compressed air. From the volute 21, the air is routed to the intake of an internal combustion engine (not shown) for boosting the performance of the engine.

The turbine wheel 22 is disposed within a turbine housing 24 that defines an annular chamber 26 for receiving exhaust gases from an internal combustion engine (not shown). The turbine housing also defines a nozzle 28 for directing exhaust gases from the chamber 26 generally radially inwardly to the turbine wheel 22. The exhaust gases are expanded as they pass through the turbine wheel, and rotatably drive the turbine wheel, which in turn rotatably drives the compressor wheel 14 as already noted.

With reference to FIGS. 1-4, in the illustrated embodiment, the wall that defines the air inlet 17 is formed in part by the compressor housing 16 and in part by a separate inlet duct member 16d that is received into a cylindrical receptacle defined by the compressor housing. The portion of the air inlet 17 proximate the compressor wheel 14 defines a generally cylindrical inner surface 17i that has a diameter generally matched to the diameter of an inducer portion 14i of the compressor wheel.

The compressor housing 16 defines a shroud surface 16s that is closely adjacent to the radially outer tips of the compressor blades. The shroud surface defines a curved contour that is generally parallel to the contour of the compressor wheel.

In accordance with the invention, the compressor of the turbocharger includes an inlet-adjustment mechanism 100 disposed in the air inlet 17 of the compressor housing. The inlet-adjustment mechanism comprises a ring-shaped assembly and is disposed in an annular space defined between the compressor housing 16 and the separate inlet duct member 16d. The inlet-adjustment mechanism is operable for adjusting an effective diameter of the air inlet into the compressor wheel. As such, the inlet-adjustment mechanism is movable between an open position and a closed position, and in some embodiments can be closed still further to a super-closed position, and can be configured to be adjusted to various points intermediate between said positions.

Figure 5:
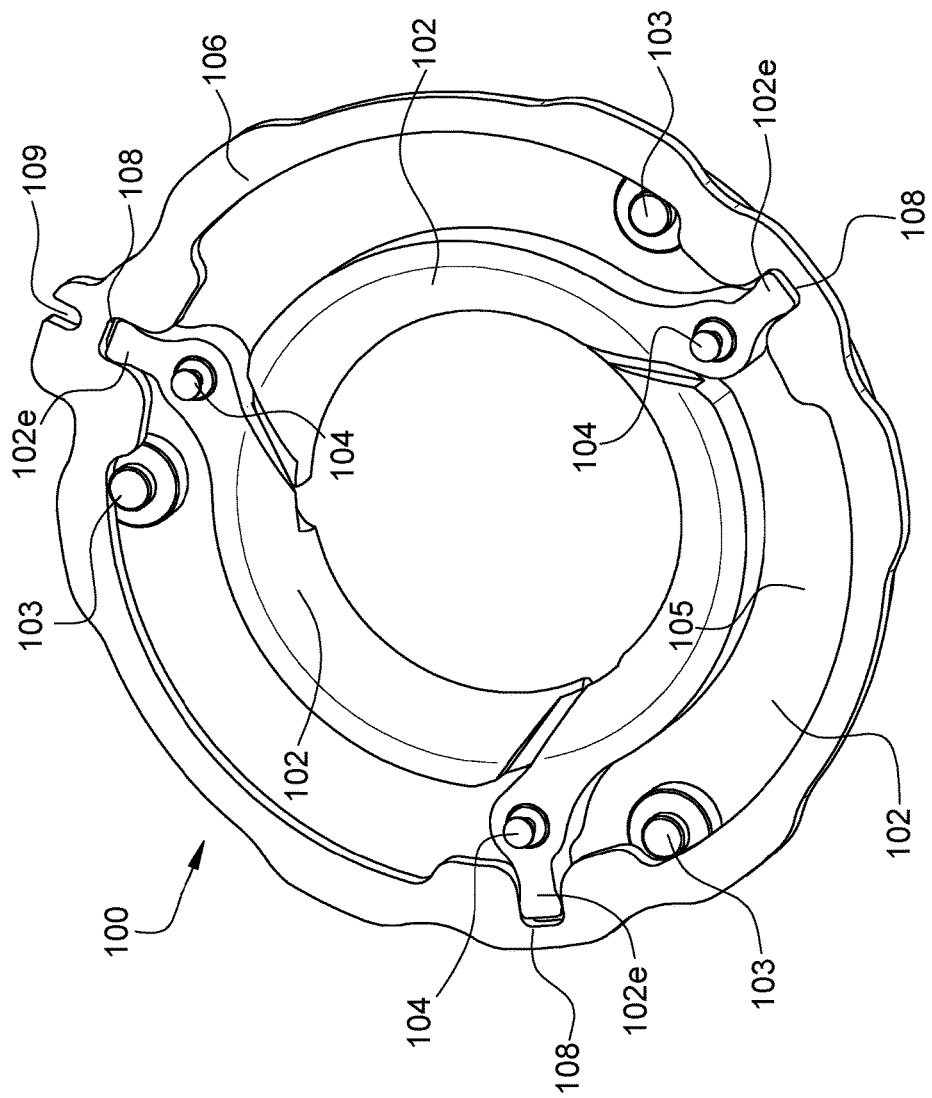
FIG. 5 is a perspective view of an inlet-adjustment mechanism for the compressor, with the top plate of the inlet-adjustment mechanism removed to show details of the blades, illustrating a closed position of the inlet-adjustment mechanism.
Figure 6:
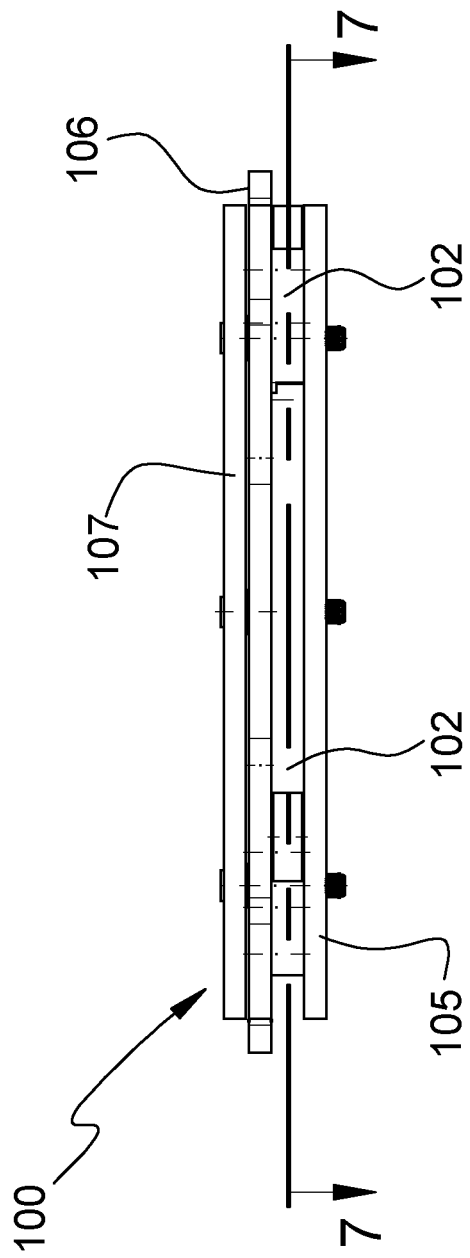
FIG. 6 is a side view of the inlet-adjustment mechanism.

With reference now to FIGS. 5 and 6, the inlet-adjustment mechanism comprises a plurality of blades 102 arranged about the central axis of the air inlet and each pivotable about a pivot pin 104 located at or near one end of the blade. In the illustrated embodiment, the inlet-adjustment mechanism comprises a stand-alone assembly or "cartridge" having a pair of annular end plates 105 and 107. The pivot pins are secured in the annular end plate 105 and the blades are arranged to rest against the end plate. The assembly of the blades 102 and unison ring 106 is captively retained between the annular end plate 105 and the second opposite annular end plate 107. The pivot pins 104 can also serve the further function of axially spacing the two end plates apart from each other. A plurality of guides 103 are also secured in the end plate 105, or optionally can be secured in the other end plate 107 instead, or can be secured to both end plates. The guides are located so as to engage the circular inner periphery of a unison ring 106 that is substantially coplanar with the blades 102. (Optionally the guides 103 can engage the outer periphery of the unison ring if the end plate diameter is large enough to support the guides radially outward of the unison ring.) The guides 103 serve to guide the unison ring when it is rotated about its central axis (which coincides with the rotational axis of the turbocharger), so that the unison ring remains substantially concentric with respect to the end plate 105. The guides 103 can comprise rollers or fixed guide pins. The inner periphery of the unison ring defines a plurality of slots 108, equal in number to the number of blades 102. Each blade includes an end portion 102e that engages one of the slots 108, so that when the unison ring is rotated about its axis, the blades are pivoted about the pivot pins 104.

Figure 4:
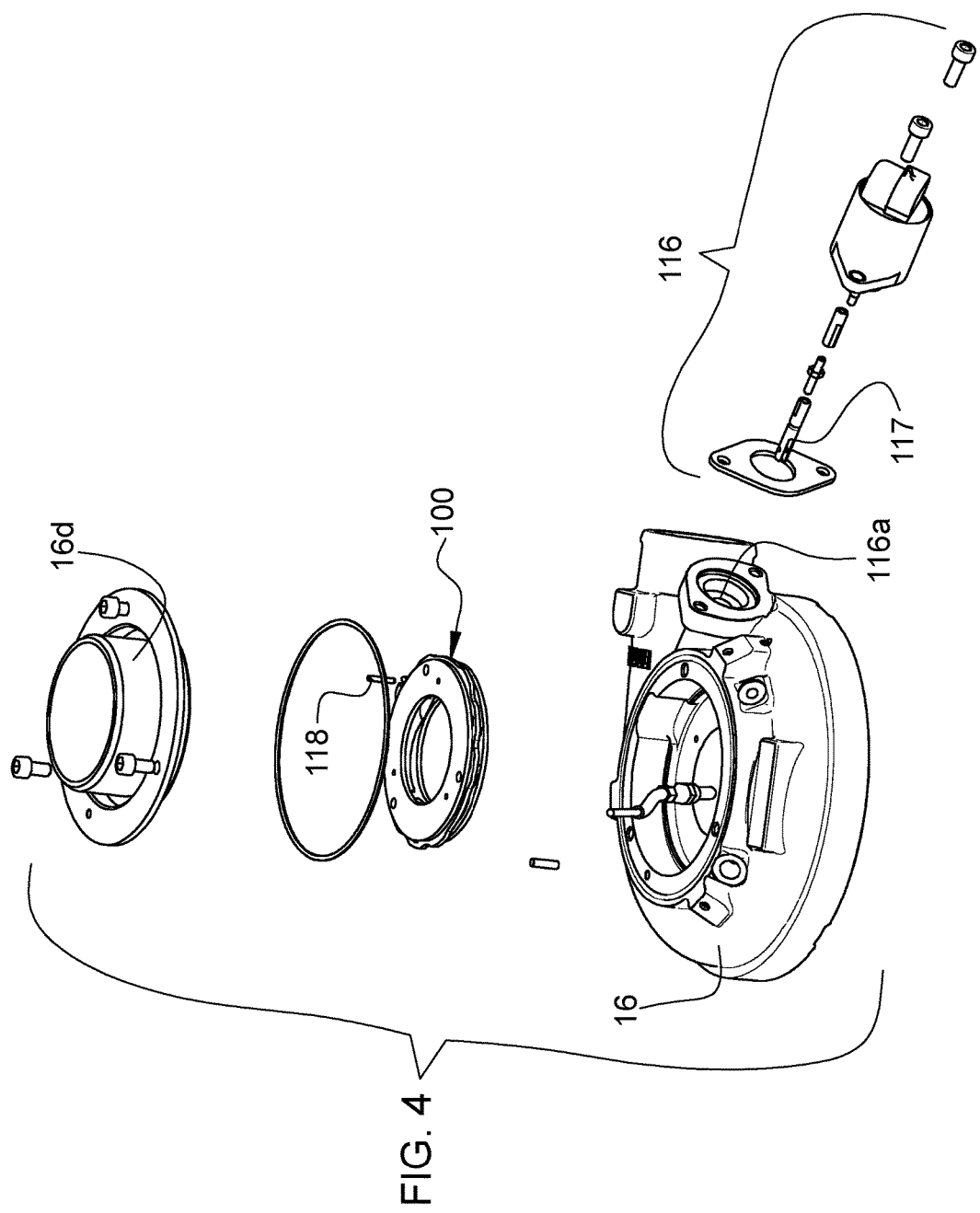
FIG. 4 is a partially exploded view of the compressor portion of FIG. 3.

As shown in FIGS. 2 and 4, the entire assembly is disposed in an annular space defined between the compressor housing 16 and the inlet duct member 16d. The two end plates 105 and 107 have an inner diameter matched to the diameter of the cylindrical inlet surface 17i proximate the inducer 14i of the compressor wheel, such that the two end plates are effectively part of the wall defining the air inlet 17, and such that the axial space between the two end plates effectively forms an opening or slot S (FIG. 2) through the wall of the air inlet. The blades 102 are arranged to pass through this slot. The radially inner edges of the blades 102 include portions that preferably are generally circular arc-shaped and these edges collectively surround and bound a generally circular opening (although the degree of roundness varies depending on the positions of the blades, as further described below).

In an alternative embodiment (not shown), instead of a cartridge form of inlet-adjustment mechanism, the inlet-adjustment mechanism can comprise a non-cartridge assembly in which the pins 104 for the blades 102 are secured in the compressor housing 16 and/or the inlet duct member 16d. Stated differently, the end plate 105 becomes an integral portion of the compressor housing 16 and the other end plate 107 becomes an integral portion of the inlet duct member 16d.

The range of pivotal movement of the blades is sufficient that the blades can be pivoted radially outwardly (by rotation of the unison ring in one direction, clockwise in FIG. 5) to an open position as shown in FIG. 7, in which the blades are entirely radially outward of the inner surface 17i of the inlet. As such, in the open position of the blades, the inlet-adjustment mechanism does not alter the nominal inlet diameter as defined by the inlet surface 17i. Optionally, the guides 103 can serve also as stops for limiting the radially outward pivoting of the blades to the open position.

The blades can also be pivoted radially inwardly (by rotation of the unison ring in the opposite direction, counterclockwise in FIG. 5) to a closed position as shown in FIG. 8. In the closed position, the circular-arc edges along the radially inner sides of the blades collectively form an orifice that is substantially a circle having a diameter that is less than that of the inlet surface 17i. ("Substantially a circle" in the present disclosure means that the circular-arc edges all lie on the same circle and collectively occupy at least 80% of the circumference of that circle.) This has the consequence that the effective diameter of the inlet is reduced relative to the nominal inlet diameter. Furthermore, in the illustrated embodiment the blades can be pivoted an additional amount to a super-closed position as shown in FIGS. 9 and 10. In the super-closed position, there is some degree of overlap of adjacent blades, which is made possible by forming the respective overlapping edge portions of adjacent blades as complementing or male-female shapes, as best seen in FIGS. 5 and 11. When the blades are in the super-closed position, the circular-arc edges of the blades collectively define an opening or orifice that is not perfectly circular but is effectively even smaller than the opening for the closed position of FIG. 8. Thus, the inlet-adjustment mechanism causes the effective diameter of the inlet to be further reduced relative to the closed position. In this manner, the inlet-adjustment mechanism is able to regulate the effective diameter of the air inlet approaching the compressor wheel.

More than one super-closed position can be accomplished in some embodiments of the invention (i.e., there can be more than one position in which adjacent blades overlap, the degree of overlap varying between those multiple super-closed positions).

As previously described, the blades 102 are actuated to pivot between their open, closed, and super-closed positions by the unison ring 106 that is rotatable about the center axis of the air inlet. Referring now to FIG. 4, rotational motion is imparted to the unison ring by an actuator 116 that is received into a receptacle 116a defined in the compressor housing. The actuator includes an actuator rod 117 that extends through a space defined in the compressor housing and is affixed at its distal end to a pin 118 that engages a slot 109 in the outer periphery of the unison ring 106. The actuator is operable to extend and retract the rod 117 linearly along its length direction so as to rotate the unison ring 106 and thereby actuate the blades 102. Extending the rod pivots the blades towards the super-closed position and retracting the rod pivots the blades toward the open position.

As noted, the inlet-adjustment mechanism 100 enables adjustment of the effective size or diameter of the inlet into the compressor wheel 14. As illustrated in FIG. 2, when the inlet-adjustment mechanism is in the closed or super-closed position, the effective diameter of the inlet into the compressor wheel is dictated by the inside diameter defined by the blades 102. In order for this effect to be achieved, the axial spacing distance between the blades and the compressor wheel must be as small as practicable, so that there is insufficient distance downstream of the blades for the flow to expand to the full diameter of the inducer portion of the compressor wheel 14 by the time the air encounters it. The inlet diameter is thereby effectively reduced to a value that is dictated by the blades.

At low flow rates (e.g., low engine speeds), the inlet-adjustment mechanism 100 can be placed in the closed or super-closed position of FIG. 8 or FIG. 9. This can have the effect of reducing the effective inlet diameter and thus of increasing the flow velocity into the compressor wheel. The result will be a reduction in compressor blade incidence angles, effectively stabilizing the flow (i.e., making blade stall and compressor surge less likely). In other words, the surge line of the compressor will be moved to lower flow rates (to the left on a map of compressor pressure ratio versus flow rate).

At intermediate and high flow rates, the inlet-adjustment mechanism 100 can be partially opened or fully opened as in FIG. 7. This can have the effect of increasing the effective inlet diameter so that the compressor regains its high-flow performance and choke flow essentially as if the inlet-adjustment mechanism were not present and as if the compressor had a conventional inlet matched to the wheel diameter at the inducer portion of the wheel.

Many modifications and other embodiments of the inventions set forth herein will come to mind to one skilled in the art to which these inventions pertain having the benefit of the teachings presented in the foregoing descriptions and the associated drawings. For example, although the illustrated embodiment employs three blades 102, the invention is not limited to any particular number of blades. The invention can be practiced with as few as two blades, or as many as 12 blades or more. The greater the number of blades, the more-nearly circular the opening circumscribed by the blades can be (although generally the opening can be circular in only one position of the blades). Accordingly, the number of blades can be selected as desired, taking into account the greater complexity with a greater number of blades, which may offset the advantage of increased circularity. Additionally, in the illustrated embodiment the blades are configured so that the opening circumscribed by the blades is approximately circular when the blades are in the closed position, and the opening is non-circular in the super-closed position. Alternatively, however, the blades can be configured so that the opening is circular in the super-closed position, in which case the opening will not be circular in the closed position. Furthermore, in the illustrated embodiment the blades are configured to partially overlap so that a super-closed position can be achieved; alternatively, however, the blades can be configured with no overlapping ability so that there is no super-closed position. Moreover, while blades with circular-arc edges have been illustrated and described, the blades do not have to have circular-arc edges. Blades with edges of different shapes (linear, elliptical, etc.) are also included within the scope of the invention. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger, comprising:
a turbine housing and a turbine wheel mounted in the turbine housing and connected to a rotatable shaft for rotation therewith, the turbine housing receiving exhaust gas and supplying the exhaust gas to the turbine wheel;
a centrifugal compressor assembly comprising a compressor housing and a compressor wheel mounted in the compressor housing and connected to the rotatable shaft for rotation therewith, the compressor wheel defining an inducer portion, the compressor housing having an air inlet wall defining an air inlet for leading air generally axially into the compressor wheel, the compressor housing further defining a volute for receiving compressed air discharged generally radially outwardly from the compressor wheel; and
a compressor inlet-adjustment mechanism disposed in the air inlet of the compressor housing and pivotable radially inwardly and radially outwardly between an open position and a closed position, the inlet-adjustment mechanism comprising a plurality of blades disposed about the air inlet and each pivotable about one end of the blade, the blades pivoting radially inwardly through a slot in the air inlet wall when the blades are in the closed position so as to form an orifice of reduced diameter relative to a nominal diameter of the inlet, wherein the blades are coplanar and respective edge portions of adjacent blades have complementing shapes configured to allow said adjacent blades to partially overlap when the blades are pivoted radially inwardly from the closed position to a super-closed position in which the blades form an orifice of further-reduced diameter relative to that of the closed position.

2. The turbocharger of claim 1, wherein each blade includes a radially inner edge having a circular-arc shape, the blades being configured so that said radially inner edges collectively form the orifice as substantially circular in a selected position of the inlet-adjustment mechanism.

3. The turbocharger of claim 2, wherein said selected position in which said radially inner edges form the orifice as substantially circular is the closed position.

4. The turbocharger of claim 1, wherein each blade includes a radially inner edge having a circular-arc shape, the blades being configured so that said radially inner edges collectively form the orifice as substantially circular in said super-closed position of the inlet-adjustment mechanism.

5. The turbocharger of claim 1, wherein the number of said blades is three.

6. The turbocharger of claim 1, wherein the inlet-adjustment mechanism comprises a cartridge including a pair of annular end plates that are axially spaced apart and wherein the blades are disposed between said end plates, the cartridge being disposed in an annular space defined by the compressor housing.

7. The turbocharger of claim 6, wherein the end plates are spaced apart by a plurality of pins that pass through holes in the blades, and the blades pivot about said pins.

8. The turbocharger of claim 1, wherein the inlet-adjustment mechanism further comprises a unison ring, the unison ring being rotatable about a rotational axis of the turbocharger, wherein each of the blades is engaged with the unison ring such that rotation of the unison ring causes the blades to pivot.

9. The turbocharger of claim 8, wherein each blade includes an end portion that engages a slot defined in an inner periphery of the unison ring.

10. The turbocharger of claim 8, wherein the inlet-adjustment mechanism further comprises a plurality of guides for guiding rotation of the unison ring.

11. The turbocharger of claim 10, wherein the guides are arranged to limit the amount of radially outward pivoting of the blades to the open position.

\* \* \* \* \*